United States Patent
Ikura (10) Patent No.: US 9,290,712 B2
(45) Date of Patent: Mar. 22, 2016

(54) PRODUCTION OF HIGH-CETANE DIESEL PRODUCT

(75) Inventor: Michio Ikura, Kanata (CA)

(73) Assignee: Her Majesty the Queen in right of Canada as represented by the Minister of Natural Resources Canada, Ottawa (CA)

( * ) Notice: Subject to any disclaimer, the term of this patent is extended or adjusted under 35 U.S.C. 154(b) by 433 days.

(21) Appl. No.: 13/819,474

(22) PCT Filed: Sep. 3, 2010

(86) PCT No.: PCT/CA2010/001369
§ 371 (c)(1),
(2), (4) Date: Apr. 25, 2013

(87) PCT Pub. No.: WO2012/027820
PCT Pub. Date: Mar. 8, 2012

(65) Prior Publication Data
US 2013/0220881 A1   Aug. 29, 2013

(51) Int. Cl.
*C10G 27/14* (2006.01)
*C10L 10/12* (2006.01)
(Continued)

(52) U.S. Cl.
CPC ............... *C10L 10/12* (2013.01); *C10G 27/14* (2013.01); *C10L 1/08* (2013.01); *B01J 21/063* (2013.01); *B01J 23/6482* (2013.01); *B01J 35/04* (2013.01); *B01J 37/0215* (2013.01);
(Continued)

(58) Field of Classification Search
CPC ......... C10L 10/00; C10L 10/12; C10G 27/00; C10G 27/04; C10G 27/12; C10G 27/14
See application file for complete search history.

(56) References Cited

U.S. PATENT DOCUMENTS

| 3,847,800 A | 11/1974 | Guth et al. |
| 4,643,820 A * | 2/1987 | Zarrineghbal et al. ........ 208/222 |

(Continued)

FOREIGN PATENT DOCUMENTS

| CA | 1287007 | 7/1991 | |
| CN | 1769386 | * 5/2006 | ............. C10G 53/14 |

(Continued)

OTHER PUBLICATIONS

Rizvi, S.Q.A. (2009). A Comprehensive Review of Lubricant Chemistry, Technology, Selection and Design, ASTM International, 657 pgs (Office action cites p. 310).*

(Continued)

*Primary Examiner* — Brian McCaig
(74) *Attorney, Agent, or Firm* — Cooper & Dunham LLP (57) ABSTRACT

Exemplary embodiments of the invention provide a process of increasing the cetane number rating of a diesel oil feedstock. The process involves reacting a diesel fuel feedstock in liquid form with ozone in gaseous form in the presence of an alcohol having two or more carbon atoms and at least one polar solvent different from the alcohol, thereby forming an ozonated diesel oil containing oxidized byproducts, wherein the alcohol and said polar solvent are employed in amounts totaling no more than about 10 vol. % of the feedstock. The oxidized byproducts are then separated from the ozontated diesel oil to produce a hydrocarbon product of increased cetane number rating relative to the feedstock oil. The product can be used as a diesel fuel or as a diesel fuel extender mixed with conventional diesel fuel of low cetane number.

6 Claims, 1 Drawing Sheet

(51) Int. Cl.
*C10L 1/08* (2006.01)
*C10G 27/00* (2006.01)
*C10G 27/04* (2006.01)
*C10G 27/12* (2006.01)
*C10L 10/00* (2006.01)
*B01J 21/06* (2006.01)
*B01J 23/648* (2006.01)
*B01J 35/04* (2006.01)
*B01J 37/02* (2006.01)

(52) U.S. Cl.
CPC . *C10G 2300/1055* (2013.01); *C10G 2300/202* (2013.01); *C10G 2300/307* (2013.01); *C10G 2300/44* (2013.01); *C10G 2400/04* (2013.01)

(56) References Cited

U.S. PATENT DOCUMENTS

| | | |
|---|---|---|
| 5,755,955 A | 5/1998 | Benham et al. |
| 5,762,655 A | 6/1998 | Kief |
| 5,972,202 A | 10/1999 | Benham et al. |
| 6,160,193 A | 12/2000 | Gore |
| 6,274,785 B1 | 8/2001 | Gore |
| 6,596,914 B2 | 7/2003 | Gore et al. |
| 6,673,236 B2 | 1/2004 | Stanciulescu et al. |
| 6,692,634 B1 | 2/2004 | Yakovlevich et al. |
| 7,754,931 B2 | 7/2010 | Monnier et al. |
| 2002/0035306 A1 | 3/2002 | Gore et al. |
| 2002/0070147 A1* | 6/2002 | Sonnemans et al. .......... 208/210 |
| 2002/0079272 A1 | 6/2002 | Sherman |
| 2003/0075483 A1 | 4/2003 | Stanciulescu et al. |
| 2006/0211906 A1 | 9/2006 | Berezutskiy |
| 2007/0137097 A1 | 6/2007 | Ikura |
| 2009/0139137 A1 | 6/2009 | Ikura et al. |
| 2010/0016641 A1 | 1/2010 | Ikura |
| 2011/0027169 A1 | 2/2011 | Monnier et al. |

FOREIGN PATENT DOCUMENTS

| | | |
|---|---|---|
| EP | 0 565 324 A1 | 10/1993 |
| GB | 2 387 175 A | 10/2003 |
| WO | WO 01/32809 A1 | 5/2001 |
| WO | WO 2005/052098 A1 | 6/2005 |
| WO | WO 2006/137978 A2 | 12/2006 |
| WO | WO 2007/075331 A2 | 7/2007 |
| WO | WO 2008/025002 A2 | 2/2008 |
| WO | WO 2010/017618 A1 | 2/2010 |

OTHER PUBLICATIONS

International Preliminary Report on Patentability, International Application No. PCT/CA2010/001369 (Mar. 5, 2013).

Murphy, M.J., Taylor, J.D. and McCormick, R.L., "Compendium of Experimental Cetane Number Data", Published by National Renewable Energy Laboratory, Sep. 2004, NREL/SR-540-36805.

* cited by examiner

PRODUCTION OF HIGH-CETANE DIESEL PRODUCT

FIELD OF THE INVENTION

The invention relates to the improvement of cetane number ratings of diesel products. More particularly, the invention relates to the production of diesel products, useful for example as diesel fuels or diesel fuel extenders, of high cetane value from diesel oils and similar feedstocks.

BACKGROUND OF THE INVENTION

During the operation of a diesel engine, air is first drawn into a combustion chamber and then compressed until it reaches a temperature above the auto-ignition temperature of a diesel fuel which is then injected into the combustion chamber under high pressure in the form of a spray or mist (i.e. as fine droplets). Under the conditions of high temperature and pressure, the diesel fuel ignites and combusts explosively to drive a piston movable within the combustion chamber. Unlike a gasoline engine, a diesel engine does not use an electrical spark to initiate fuel ignition. Therefore, a diesel fuel should have a high flash point and a low auto-ignition temperature. The flash point is the lowest temperature at which the fuel would ignite in the presence of a flash source, such as an electrical spark, in the presence of air. The auto-ignition temperature is a temperature at which the fuel automatically ignites in the presence of air without a source of ignition.

For diesel fuels, the so-called "cetane number" is a characteristic of diesel fuel quality. A diesel fuel of high cetane number combusts cleanly, having a short ignition delay leading to more time to combust, more uniform combustion and cleaner exhaust emissions. Such characteristics also lead to better fuel utilization by minimizing soot formation and increasing power output. The cetane number of a fuel can be determined by measuring the ignition delay of the fuel, i.e. the time period between the start of fuel injection and the start of combustion (ignition). Fuels with good ignition quality have short ignition delays. The ignition delay is affected by many factors such as the engine configuration (e.g. fuel injection orifice diameter) and engine operating conditions (gas cylinder ambient temperature and pressures) and fuel components, including the presence of fuel additives. Generally, diesel engines run well with diesel fuels having a cetane number from 40 to 55, and there is no performance or emission advantage when the cetane number is raised past approximately 55, although premium diesel fuels sold in Europe may have cetane numbers as high as 60 and all diesel fuels sold there are currently required to have a minimum cetane number of 51.

In North America, most States and Provinces adopt ASTM D975 as their diesel fuel standard and the minimum cetane number is set at 40, with typical values in the 42-45 range. Premium diesels may or may not have higher cetane numbers, depending on the supplier, and it is expected that minimum cetane number requirements may increase in the future in line with the European standards.

Premium diesel fuels often use additives to improve their cetane number ratings and their fuel lubricity, detergents to clean fuel injectors and minimize carbon deposits, water dispersants to avoid ignition problems, and other additives depending on geographical and seasonal needs.

Diesel fuels are generally distilled from crude oils. However, crude oils entering the market are tending to become heavier as sources of lighter crudes become depleted and the diesel fuel fraction (middle distillates) produced from such crude oils by distillation tend to have a reduced content of aliphatic hydrocarbons and an increased content of aromatic hydrocarbons. Unfortunately, aromatics tend to reduce cetane numbers of middle distillates and result in diesel fuels exhibiting longer ignition delays, as well as exhibiting poorer combustion characteristics (such as generation of soot).

Many raw hydrocarbon diesel fuels have cetane numbers less than 40 and the current practice for increasing the cetane number of such fuels is to add a small amount of a cetane number improvder, generally an alkyl nitrate, such as EHN (2-ethyl hexyl nitrate). EHN itself has a cetane number of about 350 and can thus be used in very small amounts to increase the cetane number of a raw fuel. The additive also has good performance and cost-effectiveness. When EHN is added to diesel fuel in an amount of about 0.1 vol. %, it produces a cetane number increase of about 1 to 2. When the EHN concentration is increased further, the cetane number increases accordingly, but less effectively. The increase in cetane number that can be achieved by the addition of EHN reaches a plateau at about 0.2 to 0.3 vol. %, at which level the cetane number increase reaches about 8 above the starting value of the fuel. Beyond such concentrations, there is no further beneficial effect of EHN addition.

There is therefore a need for ways of improving the cetane number ratings of diesel fuels, especially ways that can achieve cetane number increases greater than single digits.

U.S. Pat. No. 6,692,634, which issued to Yakovlevich et al. on Feb. 17, 2004, discloses a process for increasing the cetane and octane numbers of hydrocarbon fuel involving the production of a turbulent biphasic mixture of fuel and an ozone-containing gas in a flow-through chamber followed by the collection in a container having a stable pressure level. The patent states that the process involves oxonolysis and hydrogenation and that it involves the use of an electrohydrodynamic converter, which implies some form of electrochemical conversion. The patentee maintains that it is possible by this process to increase the octane or cetane number of the fuel by 3 to 5 units.

U.S. Pat. No. 5,762,655, which issued to Horst Kief on Jun. 9, 1998, discloses a method of producing an improved hydrocarbon fuel for internal combustion engines and turbines. The fuel is subjected to ozonization either forming a current of the fuel and bubbling an ozone-oxygen mixture in countercurrent through the fuel, or by enriching the fuel with oxygen and subjecting the enriched fuel to ultraviolet radiation. The patent makes no reference to cetane numbers.

US patent application US 2002/0079272 A1, which was published on Jun. 27, 2002 naming Jeffrey Sherman as inventor, discloses a method of improving the quality of diesel fuel in which an oxidizing gas, preferably ozone, is formed into sub-micron sized bubbles which are dispersed into the fuel. It is said that sulfur is removed from the fuel and the cetane rating thereof is increased.

US patent application US 2006/0211906 A1, which was published on Sep. 21, 2006 naming Ilya Zborovsky as inventor, discloses a method of purifying a liquid medium involving oxidizing the liquid medium with an oxidant using a sorbent material having an impregnated particulate catalyst. The oxidant may be air, ozone, hydrogen peroxide or other gas known for oxidizing techniques. The oxides of impurities are absorbed by the sorbent and are then separated and removed by washing the sorbent with a polar solvent, which may include alcohols. It is mentioned in paragraph [0098] that the liquid medium may be a hydrocarbon and that aromatic compounds may be removed by the process, thereby increasing the cetane rating of diesel fuel after hydrotreating because of the increased proportion of aliphatic hydrocarbons.

PCT patent publication WO 01/32809 A1, which was published on May 10, 2001 naming Raphael Caers, et al., as inventors, discloses the oxidation of distillate fuel in the presence of titanium silicate catalyst to produce hydroxyl and carbonyl groups bonded to paraffinic carbon atoms of diesel fuel molecules to provide at least 0.1 wt. % oxygen in the fuel. While the use of ozone is mentioned in the patent, it is clear that the oxidation is carried out using hydrogen peroxide in the presence of a solvent used to enable the distillate fuel and hydrogen peroxide to interact and come into contact with the catalyst. A large amount of the solvent is required (e.g. 70 vol. %, as shown in Table 1). Cetane numbers above 50 or 52 are desired.

PCT patent publication WO 2005/052098 A1, which was published on Jun. 9, 2005 naming Graham Ketley, et al., as inventors, discloses a process to improve the cetane number and emissions characteristics of distillate feedstocks by increasing the oxygen content of the feedstock. The feedstock is contacted with an oxygen-containing gas in the presence of an oxidation catalyst on a basic support. The publication teaches against the addition of expensive chemical oxidizing agents such as organic peroxides, ozone or hydrogen peroxide and uses oxygen instead under the action of a catalyst.

PCT patent publication WO 2007/07531 A2, which was published on Jul. 5, 2007 naming Thomas Palmer, et al., as inventors, discloses ring-opening of naphthalenic and aromatic rings in hydrocarbon streams derived from crude oil using an oxidation catalyst in the presence of oxygen. Thus, aromatics are transformed to aliphatics, although there is no reference to any enhancement of cetane numbers. The method involves severe operating conditions (high temperature and pressure) in the presence of an oil-soluble metal catalyst.

Canadian patent 1,287,007, which issued on Jul. 30, 1991 to James Kittrell, et al., discloses a process of upgrading diesel oil by contacting it with an oxidant selected from nitrogenous oxidizing agents and ozone and then contacting the oil with an extracting solvent. The cetane number of the fuel is said to increase by at least 5 units. Methanol and ethanol are said to be unsuitable alcohols for use as solvents.

U.S. Pat. No. 6,673,236 B2, which issued on Jan. 6, 2004 to Maria Stanciulescu et al., discloses a method of producing hydrocarbon fuels with ultra-low levels of sulfur. The method involves catalytic oxidation of sulfurous compounds within the fuel, followed by the extraction of the oxidized compounds using a polar solvent. Ethanol is used during the oxidation, and it is said that the oxidant may be hydrogen peroxide, ozone, oxygen or air, but only hydrogen peroxide is exemplified. There is no mention of improvement of cetane numbers.

SUMMARY OF THE INVENTION

Exemplary embodiments of the present invention provide a process of increasing the cetane number rating of a diesel fuel feedstock. The process involves reacting a diesel fuel feedstock with ozone in the presence of an alcohol having two or more carbon atoms and at least one polar solvent different from the alcohol, thereby forming an ozonated diesel oil containing oxidized byproducts, wherein the alcohol and the polar solvent are employed in amounts totaling no more than about 10 vol. % of the feedstock. The oxidized byproducts are then removed from the ozonated diesel oil to leave a hydrocarbon product of increased cetane number rating relative to the feedstock. The exemplary process may be carried out batchwise or, more preferably, on a continuous basis. Preferably, the diesel oil feedstock is reacted in liquid form with the ozone in gaseous form.

Other exemplary embodiments provide a process of increasing the cetane number rating of a diesel hydrocarbon fuel, which comprises mixing a diesel hydrocarbon fuel having a cetane number rating of less than 40 with a diesel fuel extender having a cetane number rating of more than 40 in relative amounts effective to form a diesel fuel mixture having a cetane number rating of more than 40, wherein the diesel fuel extender is a hydrocarbon product prepared according to the process described above.

Included in the exemplary embodiments are the products of the above processes.

It is to be noted that the cetane numbers referred to in this application, unless otherwise specified, are derived cetane numbers measured according to ASTM D6890/07b (entitled "A Standard Test Method for Determination of Ignition Delay and Derived Cetane Number (DCN) of Diesel Fuel Oils by Combustion in a Constant Volume Chamber"). This test method measures the ignition delay of the fuel and utilizes a constant volume combustion chamber with direct fuel injection into heated and compressed air. An equation correlates a measured ignition delay determination with a cetane number by Test Method D 613, resulting in a derived cetane number (DCN). In more detail, the test fuel is injected into a pre-pressurized preheated constant volume diesel engine chamber by an air-actuated injector. The start of injection is detected as the 'needle lift' of the pressure gauge and the start of fuel combustion is detected by the pressure rise. The 'ignition delay', defined as the time between the needle lift and pressure recover point, is correlated with a particular Cetane number.

The diesel oil feedstock used in the exemplary embodiments is preferably a middle distillate from crude oil or hydrogenated oil (generally boiling at temperatures between 165° C. and 350° C. at atmospheric pressure). Diesel oil from conventional crude, i.e. so-called petrodiesel, normally contains aliphatic hydrocarbons (paraffins), aromatic hydrocarbons and contaminants such as compounds of sulfur, nitrogen, oxygen, etc. While the process of the present invention is effective with all such feedstocks, feedstocks containing high levels of aromatics (e.g. those more than 70 vol. % of aromatics) tend to produce a low yield of the cetane number-improved hydrocarbon product and are consequently not preferred. Therefore, it is preferable to use feedstocks that contain at least 30 vol. % of aliphatics and, more preferably, at least 70 vol. % aliphatics. The sulfur content of the feedstock does not have a significant effect on the desired improvement of the cetane number rating, but the reaction may desirably be carried out on low-sulfur feedstocks, e.g. those containing less than 100 ppm, or even less than 5 ppm. However, it is not unusual for the sulfur content to be as high as 0.39 wt. % (3900 ppm) for feedstocks used in exemplary embodiments. While petrodiesels are the preferred feedstocks as indicated above, the exemplary embodiments may employ any hydrocarbon fuel in the diesel boiling range to obtain an increase of derived cetane number rating. Additional possible feedstocks include biodiesel and liquids derived from oilshale, oilsands, Fischer-Tropsch (F-T) processes, thermally-cracked waste oil, natural gas and liquefied plastics.

The exemplary embodiments employ both an alcohol having at least two carbon atoms and a polar solvent that is different from the alcohol. The alcohol, which is preferably ethanol, but may be another aliphatic, straight-chain alcohol having 2 to 10 carbon atoms (more preferably 2 to 8, e.g. octanol $CH_3(CH_2)_7OH$), appears to take part in the oxidation process in the presence of ozone. The alcohol may contain up to 4 vol. % water (as does industrial grade ethanol, which may consequently be used without modification) and the presence of such amounts of water is found to be preferable because it increases the electrical conductivity of the reaction mixture and thereby reduces the risk of static electricity build-up that could cause a spark that ignites the vapour in the reaction zone.

The reaction between the diesel feedstock and the ozone tends to produce a viscous brown polar precipitate (or separated liquid layer) within the reaction zone and the polar solvent is employed to reduce the viscosity of the precipitate so that it can drain from the reaction zone and may be removed with the ozonated diesel oil. Since the precipitate is polar, it is necessary to use a polar solvent to assist in this way with precipitate removal. Preferably, the polar solvent has a dipole moment greater than ethanol and also a solubility in hydrocarbons less than that of ethanol. The preferred polar solvent is methanol, but alternative polar solvents such as tetrahydrofuran (THF) and dimethylsulfoxide (DMSO) may be employed.

The ratio of alcohol to polar solvent is preferably within the range of 90:10 to 10:90 by weight, more preferably 60:40 to 40:60, and generally about 50:50 by weight. The polar solvent and/or alcohol may be mixed with the hydrocarbon before it enters the reaction zone, or may be introduced separately, but prior-mixing is preferred.

The combined amount of the alcohol and polar solvent is preferably up to 10 wt. % of the fresh diesel feedstock, but amounts as low as 2 wt. % may be employed. If amounts of more than 10 wt. % are employed, there is a possibility that the levels of these materials in the vapour phase in the reaction zone may become high enough to create a risk of explosion. However, in practice, the safe upper limit depends to some extent on the actual alcohol and polar solvent employed, and the 10 wt. % upper limit is preferred for a methanol/ethanol mixture, but may be used as a guide for other mixtures. When using ethanol/methanol, it is preferred to keep the volatiles in the vapour to less than about 6 vol. % methanol and 3.3 vol. % ethanol. The amounts of vapour depend on the operating conditions and how much of the alcohol/polar solvent is employed, but the limit of 10 vol. % is generally acceptable.

The ozone employed in the reaction is preferably produced on demand at the reaction site using an ozonator that creates gaseous ozone in a carrier gas, normally the oxygen or air from which the ozone is formed. The content of ozone in the carrier gas is usually less than 11 vol. % (because ozone in higher concentration spontaneously decomposes, sometimes explosively), and is preferably about 8 vol. %, or even as low as 4 vol. %. The ozone-containing gas is immediately introduced into the enclosed reaction zone for reaction with the preferably liquid reactants. If the carrier gas is oxygen, residual oxygen may be recirculated to the ozonator for further ozone generation, but if so, any remaining ozone should preferably first be destroyed (e.g. by heating) to avoid possible damage to the ozonator.

The ratio of ozone provided relative to the liquid reactants is not particularly critical, but rates of 1,000 to 12,000 (G/L)× ozone concentration (i.e. L-wt %/Kg) are preferred. In the indicated units, G is the fresh ozone/oxygen feed rate (litres per hour), L is the fresh oil (feedstock) feed rate (in kilograms per hour) and the ozone concentration is in wt % of ozone/carrier gas mixture. The final units become [L-wt %/Kg]. A more preferred range of the ozone supply rate is 1,000 to 7,000 L-wt %/Kg.

Pressure has little effect on the reaction and so the pressure within the reaction zone may be approximately atmospheric, although a higher or lower pressure could be employed if considered desirable for other reasons.

Preferably, the reaction is carried out at a temperature of 20 to 70° C., and more preferably 30 to 70° C. As reaction temperatures are raised, the vapour pressures of the alcohol and polar solvent rise and more of these components is stripped from the liquid reaction mixture. It is therefore preferable to limit the upper temperature to 70° C. The reaction proceeds at a reasonable rate at 30° C. and above, but may proceed acceptably at a temperature as low as room temperature (e.g. 20° C.). The reaction between the ozone and feedstock is mildly exothermic, and so the temperature within the reaction zone tends to rise above ambient temperature even if there is no preliminary heating of the feedstock. Cooling may be employed if the temperature rises above 70° C., but this is generally not needed because the evaporation of alcohol and polar solvent removes heat from the reaction mixture. It should be noted that the evaporated alcohol and polar solvent are eventually condensed and returned to the reaction mixture.

The reaction generally requires a period of time of 3 to 9 hours, but the time may be shortened or lengthened depending on the feedstocks employed, and possibly on the cetane number improvement that is desired (longer reaction times may increase the cetane number improvement). The reaction is preferably carried out as the equivalent of a stirred tank reaction, or by continuously recirculating part of the ozonated hydrocarbon back to the reaction zone. Rates of recirculation of the ozonated hydrocarbon back to the reaction zone are not critically important but should preferably range from 200 vol. times to 1,000 vol. times of the fresh feed, which is sufficiently large to mimic a stirred tank operation. Residence times of 1 to 4 may be preferred.

A large surface area within the reaction zone may be created by allowing the liquid reactants to trickle down over a particulate, porous or laminar solid in contact with the gaseous atmosphere containing ozone (with the gas moving either co-current or counter-current relative to the liquid). Alternatively, the gas may be bubbled through the liquid, but the area of contact is then much reduced and the reaction requires a much longer period of time.

The process of the exemplary embodiments can increase the cetane number of the diesel fuel feedstock quite dramatically, e.g. by 20 or more, and possibly between 30 and 100, whereas conventional methods generally produce much less of an improvement (normally only a few cetane units). Without wishing to be limited to any particular theory, it is believed that this is due to an increased fraction of saturates, decreased fraction of aromatics and, more significantly, the creation of small amounts of oxygenates having acetal structures, for example, hexanal dimethyl acetal, $C_8H_{18}O_2$, having the structure:

or other compounds that appear to act as cetane improvers.

Another surprising discovery made by the inventor is that, while oxidation catalysts may be employed in the ozonation reaction of the hydrocarbon feedstocks, their use is not essential and, indeed, similar results can be achieved without added (i.e. external) catalysts, i.e. in the absence of an introduced oxidation catalyst.

Following the treatment with ozone, the oxidized compounds are removed and the remaining hydrocarbon product may be used as diesel fuel without further treatment, or more desirably may be used as diesel fuel extenderd, i.e. products that can be mixed with diesel fuel of low cetane number rating to produce a mixed fuel of improved cetane number rating. When used in this way, the product of the exemplary embodiments might also be called a cetane number "improver", but generally the term "improver" is used to mean a compound that itself is not considered to be a diesel fuel but that may be used in small quantities to improve the cetane number rating of a diesel fuel. An "extender" is primarily a hydrocarbon product of high cetane number that may itself be used as a diesel fuel but that may alternatively be mixed with a different diesel fuel to improve the properties of the latter. Generally, the cetane number rating of the product of the exemplary embodiments is 60 or more, and often of more than 70 and may be up to 150. As noted earlier, diesel fuels having cetane number ratings above about 55 show no further practical advantages, so there is generally no point in using a product having a cetane number rating above 55 directly as a fuel. Indeed, the minimum cetane number rating of diesel fuels in North America is 40 and often there is no economic advantage in providing fuels having higher cetane number ratings than this. Therefore, the products of the exemplary embodiments are advantageously used as diesel fuel extenders, i.e. they are mixed with low cetane fuels to produce a mixture having a cetane number rating of 40 or more, or of an even higher number (e.g. 50-55) if required for markets such as Europe. For example, the addition of just 7 vol. % of a product having a cetane number rating of 120 to a fuel having a rating of 40 raises the cetane number rating of the resulting blend to a desirable 45.

BRIEF DESCRIPTION OF THE DRAWINGS

The present invention will now be described in further detail with reference to the following drawing, in which.

DETAILED DESCRIPTION OF THE EXEMPLARY EMBODIMENTS

Figure 1:
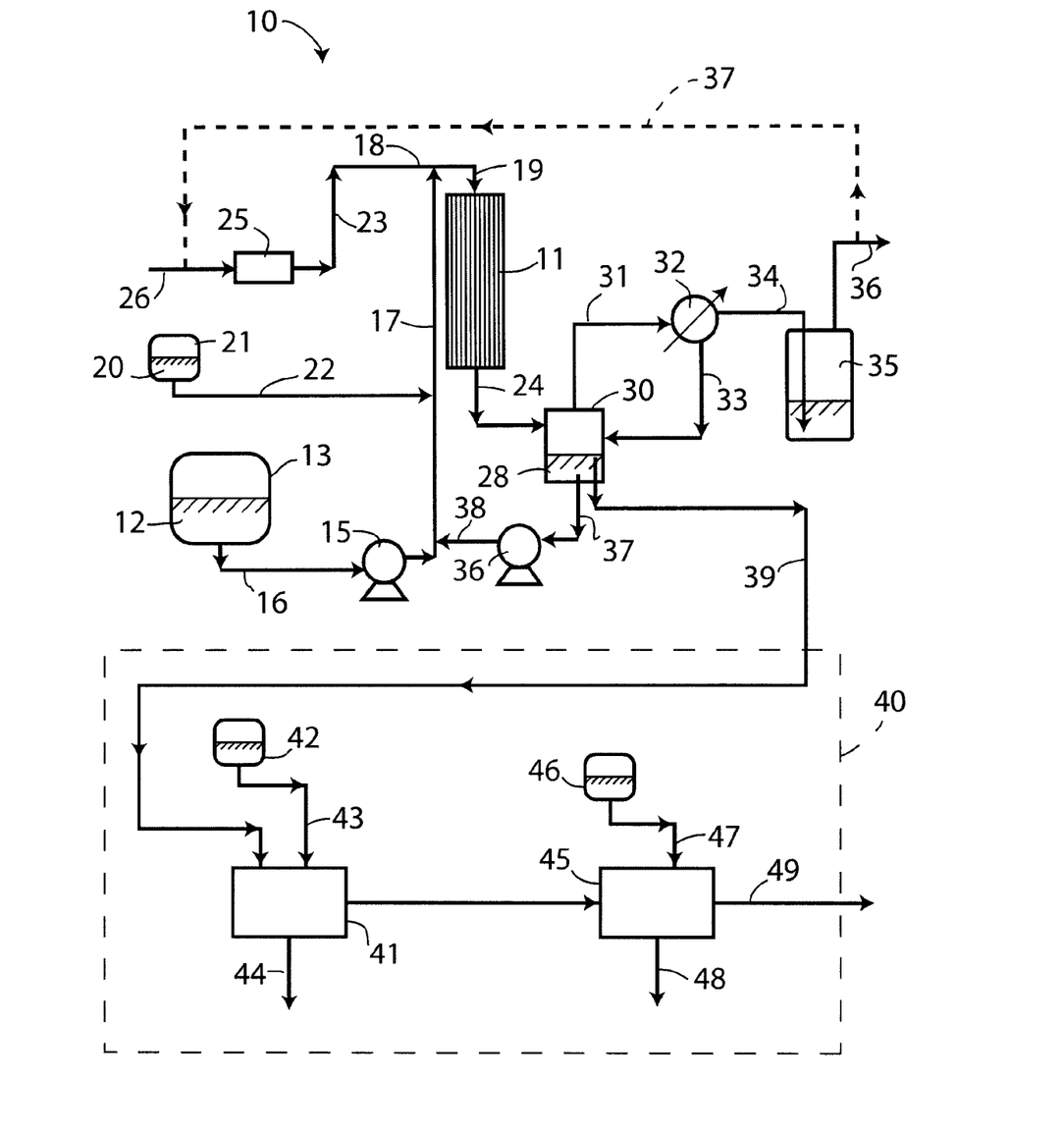
FIG. 1 is a schematic diagram illustrating an exemplary embodiment of apparatus suitable for carrying out one form of an exemplary process according to the invention.

An exemplary process and apparatus are illustrated in FIG. 1 of the accompanying drawing. The apparatus 10 comprises a reactor 11 defining an enclosed internal reaction zone that is preferably filled or partially-filled with a solid of high surface area, e.g. a particulate solid, a solid having open pores therein, a laminar solid, or other solid element or elements shaped to provide a large surface area relative to its volume. The solid is preferably inert, e.g. it may be made of silica, alumina, glass or metal, but may include a support for an oxidation catalyst as will be described later. Fresh diesel oil feedstock 12 is supplied from a reservoir 13, such as a feed tank, to the top of the reactor 11 by means of a feed pump 15 via pipes 16, 17, 18 and 19. A mixture 20 of an alcohol (preferably ethanol containing 4 vol. % water) and a polar organic solvent (preferably methanol) is supplied from a reservoir 21, such as a feed tank, via pipe 22 to feedstock pipe 17 where it is mixed with the diesel oil feedstock before the feedstock is introduced into the reactor 11. A mixture of ozone in a carrier gas (oxygen or air) is introduced into the reactor 11 via pipes 23 and 18 after being generated in an ozonator 25 from a supply of air or oxygen fed through pipe 26. The ozone may be mixed with the feedstock and alcohol/solvent mixture before entry into the reactor 11, as shown, or it may be introduced separately at the top of the reactor 11. If necessary, the diesel oil feedstock 12 may be heated (e.g. by means of an electrical heater, not shown) before it is introduced into the reactor 11 to ensure that a suitable reaction temperature, e.g. in the range of 20° C. to 70° C., is maintained in the reaction zone. This may be necessary at the start-up of the apparatus, but may become unnecessary during later operation due to heat generated by the exothermic oxidation reaction that takes place in the reaction zone.

In the reactor 11, the feedstock and alcohol/solvent mixture trickles down over the solid of high surface area within the reaction zone in contact with the gaseous ozone and carrier gas. A partial oxidation of the liquid reactants takes place to produce a liquid ozonated diesel oil 28 that collects at the bottom of the reactor and is transferred by gravity via pipe 24 to a sump 30 (i.e. a collection vessel located below the reactor 11). The sump 30 also collects ozone-depleted gas and vapor from the reactor 11 and this is vented via pipe 31 and passed through a condenser 32 where alcohol/solvent is condensed and returned to the sump 30 via pipe 33. Vessel 35 is an alcohol stripper that serves to remove any residual alcohol (in this case ethanol) and polar solvent (in this case methanol) from the gas stream exiting the condenser 32 via pipe 34. The alcohol stripper 35 serves two purposes: (1) to condense alcohol carry-over both by vapour pressure and as a mist, and (2) to saturate the exiting oxygen or air with water to prevent water stripping from the wet gas flow meter (not shown). The alcohol and polar solvent-stripped gas, which is the carrier gas and any residual ozone, may be vented via pipe 36 to the atmosphere or returned to the ozonator 25 via pipe 37 (shown in broken lines to reflect the fact that this step is optional). For example, if the carrier gas is oxygen, it would be economically desirable to recycle the gas to the ozonator, but not if the carrier gas is air. If the gas is recycled, steps should preferably be taken to ensure that it does not contain any residual ozone. This can be done by carefully controlling the amount of ozone initially fed to the reactor 11 to ensure that all of the ozone is consumed, or by heating the residual gas to an elevated temperature to destroy any remaining ozone.

A portion of the liquid ozonated diesel oil 28 collected in the sump 30 is recirculated by recirculation pump 36 to the reactor 11 via pipes 37, 38, 17, 18 and 19. The recirculated portion is mixed with the fresh feedstock in pipe 17. The remainder of the liquid ozonated diesel oil 28 is transferred via pipe 39 to a solvent extraction section 40 where the oil undergoes a two-stage solvent extraction to remove oxidized byproducts contained therein. The oil is introduced into a first extractor 41 where it is mixed with a polar solvent, e.g. methanol, dimethysulfoxide (DMSO) or tetrahydrofuran (THF), from a reservoir 42 introduced into the first extractor via pipe 43. The solvent extracts polar materials from the oil and is removed via pipe 44. The treated oil is then passed to second extractor 45 where the extraction procedure is repeated using further methanol or other polar solvent from reservoir 46 introduced into the extractor via pipe 47. The polar solvent fraction is then removed through pipe 48 and the final hydrocarbon product of high cetane number rating is removed through pipe 49.

The ratio of the amount of ozonated diesel oil recycled to the reactor 11 via pump 36 to the amount directed to the solvent extraction section 40 determines the average residence time of the oil in the reactor 11 and thus the duration of the ozone treatment. This ratio is preferably selected to give a reaction time in a range of 3 to 9 hours.

The solvent phase removed from the solvent extractors 41 and 45 via pipes 44 and 48 may contain dissolved hydrocarbon and can be distilled to separate the hydrocarbon content from other materials. The resulting separated hydrocarbon may be used or sold as a low-quality fuel (e.g. bunker fuel) or it may be recirculated (not shown) to the reactor 11 as part of the recirculated oil.

As noted above the ozonation may be carried out in the absence of a catalyst, but a catalyst may be provided, if desired. When employed, the catalyst should be one that promotes oxidation and may be, for example, a mixture of $V_2O_5$ and $TiO_2$ with or without Pt. The catalyst may be supported on a porous solid, e.g. a honey-comb structure having many (e.g. 29) wash-coated square channels per square centimeter containing approximately 9.0 wt. % $V_2O_5$, 0.69 wt. % $TiO_2$ and 0.13 wt. % Pt.

The apparatus of FIG. 1 employs downward flow of the reactants, but an arrangement involving upward flow may be used alternatively, but is not generally preferred.

Preferred forms of the exemplary embodiments are illustrated further by the following Examples.

EXAMPLES

Tests were carried out on various feedstock hydrocarbons, including oils identified as AWUT, AWTD, E-LCO (from a Canadian refiner) and Canadian Ultra-Low Sulfur Diesel (ULSD). The characteristics of these feedstocks are shown in Table 1 below.

TABLE 1

Characteristics of Feedstock oils

| Analyses | ASTM Method D86 | Feedstock Oils | | | |
|---|---|---|---|---|---|
| | | AWUT | AWTD | E-LCO | Canadian ULSD |
| Distillation | | | | | |
| IBP (Initial boiling point) | | 188 | 205.5 | 226.6 | 155.4 |
| 10 vol % boil-off temperature (° C.) | | 216 | 211.8 | 258.1 | 183.4 |
| 50 vol % boil-off temperature (° C.) | | 286 | 280.7 | 286.2 | 234.8 |
| 90 vol % boil-off temperature (° C.) | | 344 | 339.5 | 348.4 | 304.4 |
| FBP (Final boiling point) | | 365 | 365.3 | 366.3 | 347.2 |
| Elemental analysis | | | | | |
| Carbon (wt %) | D5291 | 86.92 | 87.31 | 88.54 | 87.28 |
| Hydrogen (wt %) | D5291 | 13.20 | 13.52 | 9.6 | 14.0 |
| Sulphur (wt % or ppm) | D1552 | 0.39% | 0.34% | 2.11% | 3.2 ppm |
| Nitrogen (ppm) - Antek | In house | 498 | 126 | 1156 | <1 |
| Chlorine (ppm) | INAA* | 78 | 52 | 6.3 | <1 |
| Miscellaneous | | | | | |
| Density at 15° C. (kg/m³) | D4052 | 842 | 835.6 | 966.5 | 820.8 |
| Kinematic viscosity at 40° C. (cSt) | D445 | 2.9 | 2.8 | 3.98 | 2.01 |
| Cloud point (° C.) | D5773 | −10.6 | −10.6 | ND** | −26.4 |
| Pour point (° C.) | D5949 | −16 | −14 | −12 | −33.0 |
| Flash point (° C.), Pensky-Marten | D93 | 71.5 | 74.5 | 98.5 | 51.2 |
| Total acid number (mg/g) | D664 | 0.45 | 0.037 | 0.013 | 0.016 |
| Derived Cetane number (DCN) | D6890/07b | 52.34 | 52.21 | 23.66 | 49.02 |
| Colour | D1524 | 7.5 | 4.0 | 5.5 | 1.0 |
| Electrical conductivity at 24° C., pS/m | D2624 | 1950 | 47 | 300 | 1410 |
| Hydrocarbon types | D2786/D3239 | | | | |
| Saturates (wt %) | | 61.0 | 62.7 | 22.7 | 69.7 |
| Paraffins | | 32.4 | 33.6 | 13.5 | 29.1 |
| Cycloparaffins | | 28.6 | 29.2 | 9.2 | 40.6 |
| Aromatics (wt %) | | 26.5 | 22.9 | 76.1 | 30.3 |
| Monoaromatics | | 16.6 | 15.4 | 10.4 | 20.2 |
| Diaromatics | | 7.1 | 5.7 | 42.0 | 9.6 |
| Polyaromatics | | 1.1 | 0.7 | 10.7 | 0.2 |
| Aromatic sulphur | | 1.7 | 1.1 | 13.0 | 0.3 |
| Olefins (wt %) | | 12.2 | 14.1 | 0.9 | 0.1 |
| Polar (wt %) | | 0.2 | 0.3 | 0.3 | 0.0 |

Notes:
INAA* (Instrumental Neutron Activation Analysis),
ND** indicates "not detectable".
Distillation curves for AWUT and Canadian ULSD were determined by simulated distillation.
Distillation curve for AWTD was determined by mini-distillation.
Distillation date for E-LCO was provided by the feedstock supplier.

These feedstock oils were subjected to oxidation with ozone either in the downflow arrangement of FIG. 1 or in an upflow arrangement. The treatment conditions were as shown in Tables 2 below.

TABLE 2

| Run ID | Oil feed rate (g/hr) | Oil recycle rate (L/h) | $O_2/O_3$ gas feed rate (cm³/min) | Fresh gas feed/Liquid feed rate ratio (cc/h/g/h) | Feed gas $O_3$ conc. (wt %) | (G/L)*$O_3$ conc. (Lwt %/kg) | Liquid holdup in the system (cc) | Ethanol (& MeOH) feed rate cc/hr |
|---|---|---|---|---|---|---|---|---|
| Up-Flow |
| Feed: AWUT (without catalyst) |
| 120907-1 | 72.0 | 83.5 | 3000 | 2500 | 4.0 | 10000 | 1060 | 8.1 |
| 130907-1 | 78.0 | 83.5 | 3000 | 2308 | 4.0 | 9231 | 1060 | 8.9 |
| 140907-1 | 71.0 | 83.5 | 3000 | 2535 | 4.0 | 10141 | 1060 | 8.3 |
| 190907-1 | 76.0 | 83.5 | 3000 | 2368 | 4.0 | 9474 | 1090 | 9.1 |
| 200907-1 | 78.0 | 83.5 | 3000 | 2308 | 4.0 | 9231 | 1090 | 8.0 |
| 210907-1 | 72.0 | 83.5 | 3000 | 2500 | 4.0 | 10000 | 1090 | 9.0 |
| Feed: AWUT (with catalyst) |
| 091107-1 | 296.0 | 70.2 | 18000 | 3649 | 3.3 | 12041 | 665 | 39.2 |
| 081107-1 | 308.0 | 70.2 | 18000 | 3506 | 3.4 | 11922 | 665 | 38.0 |
| 081107-1 | 308.0 | 70.2 | 18000 | 3506 | 3.4 | 11922 | 665 | 38.0 |
| Feed: Certified No. 2 diesel (with catalyst) |
| 020507 | 105 | 83.5 | 4900 | 2800 | 2.8 | 7800 | 850 | 2.5 |
| 030507 | 100 | 83.5 | 4900 | 2940 | 2.7 | 7938 | 850 | 2.5 |
| Down-Flow |
| Feed: AWUT (with catalyst) |
| 190208-1 | 368.0 | 90.7 | 18000 | 2935 | 3.1 | 9098 | 795 | 49.2 |
| 190208-1 | 368.0 | 90.7 | 18000 | 2935 | 3.1 | 9098 | 795 | 49.2 |
| 190308-1 | 384 | 90.7 | 1600 | 250 | 4.0 | 1000 | 855 | 46.8 |
| 010808-1 | 107 | 90.7 | 6090 | 3415 | 4.0 | 13660 | 815 | 12 |
| 210808-1 | 101.3 | 90.7 | 3060 | 1812 | 4.0 | 7250 | 900 | 12.3 |
| 030908-1 | 197 | 90.7 | 3070 | 935 | 3.99 | 3731 | 920 | 27.1 |
| 180608 | 152 | 90.7 | 6030 | 2380 | 4.3 | 10235 | 860 | 16.6 |
| 100708 | 78.0 | 90.7 | 2970 | 2285 | 4.0 | 9138 | 880 | 8.8 |
| 110708 | 72.0 | 90.7 | 2940 | 2450 | 4.0 | 9800 | 880 | 7.8 |
| Feed: E-LCO (with catalyst) |
| 031008-2 | 206 | 90.7 | 3040 | 885 | 3.94 | 3489 | 850 | 24.6 |
| 171008-1 | 120 | 90.7 | 3050 | 1525 | 4.08 | 6222 | 750 | 11.8 |
| Feed: AWTD (without catalyst) |
| 160109-1 | 72.8 | 90.7 | 2900 | 2464 | 3.91 | 9635 | 960 | 8.72 |
| Feed: Canadian ULSD (with catalyst) |
| 130209-1 | 71.3 | 90.7 | 2930 | 2466 | 3.8 | 9468 | 900 | 9.8 |

| Run ID | Total liquid input (cc/h) | Liquid resid. time (h) | Reactor temp. (° C.) | Exiting $O_3$ conc. (wt %) | Oil yield (wt % feed used in extraction) | Sulphur conc. (wt %) | Cetane Number |
|---|---|---|---|---|---|---|---|
| Up-Flow |
| Feed: AWUT (without catalyst) | | | | | | 0.3900 | 52.3 |
| 120907-1 | 92.8 | 11.4 | 44 | 0.78 | 68.5 | 0.0491 | 89.5 |
| 130907-1 | 100.7 | 10.5 | 44 | 0.79 | 67.1 | 0.0472 | 97.4 (Two samples combined, Oven dried) |
| 140907-1 | 91.8 | 11.5 | 43 | 0.82 | 66.6 | 0.0430 | |
| 190907-1 | 98.5 | 11.1 | 31 | 0.95 | 68.8 | 0.0620 | 85.9 |
| 200907-1 | 99.8 | 10.9 | 30 | 1.08 | 68.2 | 0.0520 | 91.3 |
| 210907-1 | 93.7 | 11.6 | 30 | 1.14 | 68.6 | 0.0493 | 92.9 |
| Feed: AWUT (with catalyst) | | | | | | 0.3900 | 52.3 |
| 091107-1 | 387.4 | 3.9 | 44 | 1.28 | 65.7 | 0.0497 | 148.6 |
| 081107-1 | 400.4 | 4.0 | 45 | 1.2 | 66.9 | 0.0507 | 157.0 |
| 081107-1 | 400.4 | 4.0 | 45 | 1.2 | 66.9 | 0.0507 | 149.9 |
| Feed: Certified No. 2 diesel (with catalyst) | | | | | | 0.0360 | 45.7 |
| 020507 | 126.0 | 6.7 | 70 | | 77.4 | 0.0033 | 76.4 (Two samples combined, Oven dried) |
| 030507 | 120.1 | 7.1 | 70 | | 73.1 | 0.0032 | |
| Down-Flow |
| Feed: AWUT (with catalyst) | | | | | | 0.3900 | 52.3 |
| 190208-1 | 482.1 | 1.6 | 41 | 1.16 | 67.3 | 0.0801 | 97.1 (Rotovap) |
| 190208-1 | 482.1 | 1.6 | 41 | 1.16 | 67.3 | 0.0801 | 78.5 (Oven dried) |

TABLE 2-continued

| | | | | | | | |
|---|---|---|---|---|---|---|---|
| 190308-1 | 499 | 1.7 | 40 | 0.00 | 76.5 | 0.2433 | 74.1 |
| 010808-1 | 138 | 5.9 | 74 | 0.36 | 56.9 | 0.0261 | 124.6 |
| 210808-1 | 131 | 6.8 | 66 | 0.00 | 67.6 | 0.0569 | 131.3 |
| 030908-1 | 259 | 3.6 | 65 | 0.04 | 73.0 | 0.1720 | 113.1 |
| 180608 | 195.4 | 4.4 | 43 | 0.94 | 65.9 | 0.0370 | 112.8 (Three |
| 100708 | 100.6 | 8.8 | 65 | 0.00 | 64.7 | 0.0362 | samples |
| 110708 | 92.5 | 9.5 | 64 | 0.00 | 65.0 | 0.0354 | combined) |
| Feed: E-LCO (with catalyst) | | | | | | | 23.7 |
| 031008-2 | 267 | 32. | 66 | 0.00 | 58.1 | 1.5700 | 32.9 |
| 171008-1 | 153 | 4.9 | 66 | 0.00 | 48.9 | 1.2300 | 39.0 |
| Feed: AWTD (without catalyst) | | | | | | 0.3400 | 52.2 |
| 160109-1 | 94 | 10.2 | 66 | 0.00 | 63.0 | 0.0318 | 111.1 |
| Feed: Canadian ULSD (with catalyst) | | | | | | 0.003 | 49.0 |
| 130209-1 | 93.7 | 9.6 | 65 | 0.00 | 65 | 0.0002 | 93.1 |

Note:
The examples employed a commercial oxidation catalyst consititing of mainly $V_2O_5$, $TiO_2$ and a trace of Pt, except for those marked "without catalyst" for which no catalyst was employed.
Unless noted specifically, all samples were dried (methanol removed) using a Rotovap. A Rotovap is a rotating glass flask immersed in hot water.
The flask is connected to a water aspirator to operate under vacuum for easy solvent evaporation. Light components (methanol in this case) leaves the hot flash and enters a condenser where it is condensed.

The cetane numbers of the products are shown in Table 3 below. Table 3 is a summary to Table 2 showing important process parameters.

TABLE 3

| | | | | | | |
|---|---|---|---|---|---|---|
| | | | | Clean oil | | |
| | | Liquid | | yield | | |
| | | resid. | Sulphur | wt % of feed | | |
| | Severity | time | conc. | used in | Cetane | |
| Sample ID | L wt %/kg | h | wt % | extraction | number | Remarks |
| Up-flow | | | | | | |
| AWUT | 0 | | 0.3900 | | 52.3 | |
| 120907-1* | 10000 | 11.4 | 0.0491 | 68.5 | 89.5 | After 33 months |
| 130907-1* | 9231 | 10.5 | 0.0472 | 67.1 | 97.4 | Two samples were |
| 140907-1* | 10141 | 11.5 | 0.0430 | 66.6 | | combined |
| 190907-1* | 9474 | 11.1 | 0.0620 | 68.8 | 85.9 | After 33 months |
| 200907-1* | 9231 | 10.9 | 0.0520 | 68.2 | 91.3 | After 33 months |
| 210907-1* | 10000 | 11.6 | 0.0493 | 68.6 | 92.9 | After 33 months |
| 091107-1-3 | 12041 | 1.7 | 0.0497 | 65.7 | 148.6 | Original |
| 081107-1 | 11922 | 1.7 | 0.0507 | 66.9 | 157.0 | After 7 months |
| 081107-1 | 11922 | 1.7 | 0.0507 | 66.9 | 149.9 | After 7 months, Repeat |
| No. 2 diesel | 0 | | 0.0360 | | 45.7 | |
| 020507 | 7800 | 6.7 | 0.0332 | 77.4 | 76.4 | Two samples were |
| 030507 | 7938 | 7.1 | 0.0316 | 73.1 | | combined |
| Down-flow | | | | | | |
| AWUT | 0 | | 0.3900 | | 52.3 | |
| 190208-1-4 | 9098 | 1.8 | 0.0801 | 67.3 | 97.1 | Roto-vap |
| 190208-1-4 | 9098 | 1.8 | 0.0801 | 67.3 | 78.5 | Oven dry |
| 190308-1 | 1000 | 1.7 | 0.2433 | 76.5 | 74.1 | |
| 010808-1 | 13660 | 5.9 | 0.0261 | 56.9 | 124.6 | |
| 210808-1 | 7250 | 6.8 | 0.0569 | 67.6 | 131.3 | |
| 030908-1 | 3731 | 3.6 | 0.1720 | 73.0 | 113.1 | |
| 180608 | 10235 | 4.4 | 0.0370 | 65.9 | 112.8 | Three samples were |
| 100708 | 9138 | 8.8 | 0.0362 | 64.7 | | combined |
| 110708 | 9800 | 9.5 | 0.0354 | 65.0 | | |
| E-LCO | 0 | | 2.11 | | 23.7 | |
| 031008 | 3489 | 3.2 | 1.57 | 58.1 | 32.9 | |
| 171008 | 6222 | 4.9 | 1.23 | 48.9 | 39.0 | |
| AWTD | 0 | | 0.3400 | | 52.2 | |
| 160109-1 | 9635 | 10.2 | 0.0318 | 63.0 | 111.1 | |
| Canadian ULSD | 0 | | 3 ppm | | 49.0 | |
| 130209 | 9468 | 9.6 | 2 ppm | 64.8 | 93.1 | |

Note:
1) All samples except 190208-1-4 were stripped of alcohols by Rotovap at 85° C. for 1 h. The 190208-1-4 sample was oven dried at 110° C. for 2 h.
2) Asterisk (*) indicates runs were conducted without the oxidation catalyst.
3) The operational severity is defined by $[(G/L)*O_3]$ where G is fresh gas feed (L/h), L is fresh liquid feed (kg/h) and $O_3$ (wt %) is ozone concentration, and has a unit of $[(L/h) \cdot wt\%/kg/h)]$.

The derived cetane number ratings were determined according to ASTM D6890/07b.

Runs 081107 and 091107 in Table 3 were conducted under essentially identical conditions. The sample from Run 081107-1 was kept at room temperature for seven months in a transparent glass bottle. Two measurements were done for the same sample and slightly different results 157.0 versus 149.9 were determined.

Significant cetane number enhancements were achieved in various runs, e.g. 34-96 for AWUT (upflow), 26-78 for AWUT (downflow), and 44 for Canadian ULSD. It can be seen from Table 3 that runs 120907 to 140907 and 190907 to 210907 were carried out in the absence of a catalyst, but nevertheless gave good enhancements of cetane number rating. However, the tests carried out on E-LCO gave more modest enhancements of 9-15, and this is believed to be due to the high content of aromatics (76.1 wt. %) and low content of saturates (22.7 wt. %) that resulted in the formation of only moderate amounts of cetane-modifying compounds.

The invention claimed is:

1. A process of increasing the cetane number rating of a diesel oil feedstock, which process comprises the steps of:
    reacting a diesel fuel feedstock with ozone in the presence of an alcohol having two or more carbon atoms and at least one polar solvent different from said alcohol, thereby forming an ozonated diesel oil containing oxidized byproducts, wherein said alcohol and said polar solvent are employed in amounts totalling no more than about 10 vol.% of said feedstock; and
    separating said oxidized byproducts from said ozonated diesel oil to produce a diesel hydrocarbon product of increased cetane number rating relative to said feedstock;
    wherein said reacting of said feedstock with said ozone is carried out in the absence of an introduced oxidation catalyst.

2. The process of claim 1, wherein said diesel fuel feedstock has a sulfur content of less than 100 ppm.

3. The process of claim 1, wherein said reacting of the diesel fuel feedstock with said ozone is carried out for a period of time in a range of 3 to 9 hours.

4. A process of increasing the cetane number rating of a diesel oil feedstock, which process comprises the steps of:
    reacting a diesel fuel feedstock with ozone in the presence of an alcohol having two or more carbon atoms and at least one polar solvent different from said alcohol, thereby forming an ozonated diesel oil containing oxidized byproducts, wherein said alcohol and said polar solvent are employed in amounts totalling no more than about 10 vol.% of said feedstock; and
    separating said oxidized byproducts from said ozonated diesel oil to produce a diesel hydrocarbon product of increased cetane number rating relative to said feedstock;
    wherein said reacting of said feedstock with said ozone is carried out in the presence of an introduced oxidation catalyst, and said catalyst contains $V_2O_5$, $TiO_2$ and optionally metallic Pt.

5. The process of claim 4, wherein said diesel fuel feedstock has a sulfur content of less than 100 ppm.

6. The process of claim 4, wherein said reacting of the diesel fuel feedstock with said ozone is carried out for a period of time in a range of 3 to 9 hours.

* * * * *